Patented Oct. 16, 1951

2,571,095

UNITED STATES PATENT OFFICE 2,571,095

METHOD OF PREVENTION OF DETERIORATION IN SEEDS

Aaron M. Altschul, Marjorie Z. Condon, and Madeline G. Lambou, New Orleans, La., assignors to The United States of America as represented by the Secretary of Agriculture No Drawing. Application November 8, 1949, Serial No. 126,262

5 Claims. (Cl. 167—38)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to seeds, particularly cottonseed, flaxseed, sunflower seed, rice, and grain sorghum, and has among its objects the provision of a process of chemically treating such seeds to prevent their heating during storage. Another object is to allow for drying of the seeds by aeration at atmospheric temperatures without suffering any loss in quality of the seed. Another object is to prevent the formation of free fatty acids from glycerides in seeds such as cottonseed, flaxseed, rice, and so forth, during storage. Other objects will be apparent from the description of the invention.

The deterioration of seeds during storage is the result of natural processes involving the activity of enzyme systems within the seeds and of micro-organisms associated with the seeds. When the moisture content of seeds is high, various biological processes are accelerated and are reflected in increased rates of deterioration. Moreover, when seed of high moisture content is stored in bulk, the heat produced by respiration and especially by accelerated respiration cannot ordinarily be dissipated rapidly from the seed pile with the result that the temperature of the seed pile is increased. The heating of stored oilseeds, grains, and other products of vegetable origin by processes which are the result of, or which are accompanied by, accelerated respiration is commonly referred to as spontaneous heating. Spontaneous heating, or increased temperatures resulting from biological activity of the seed and its associated micro-organisms, accelerates and aggravates various deteriorative processes which normally take place to various degrees in seed of high moisture content.

Any process which occurs during handling and storage of seed prior to processing and which results in decreased value of the seed, or of its derived products, for food or industrial purposes may be classed as deterioration. In oilseeds, such as cottonseed, flaxseed, sunflower seed, and so forth, the hydrolysis of the natural glycerides (fats and oils) to form free fatty acids during storage constitutes an example of a specific type of deterioration. Spontaneous heating of seeds in storage provides a favorable environment for the growth of molds and other microorganisms which contribute to the total respiration and to an augmentation of the heat evolved. Any extensive mold proliferation or other microbiological activity in the seed which results in lowering the quality and utility of the seed or its derived products for food and industrial uses constitutes another form of deterioration. The development of abnormal colors and flavors in stored seed likewise constitutes deterioration.

Deterioration resulting from the activity and growth of molds and fungi also serves to attract and facilitate damage resulting from insect infestation. Although the methods and techniques of control of insect infestation differ from those used to control deterioration resulting from the biological activity of the seeds and the resulting micro-organisms, the control of deterioration caused by the latter factors will indirectly help in minimizing deterioration caused by insects. A sound, healthy seed, free of mold and without any serious breakdown of its chemical constituents is better able to withstand attack by insects.

Prior to storage, it is customary practice to reduce the moisture content of seed of excessively high moisture by such methods as blowing warm air over or through the seed. This is generally accomplished in dryers which are mechanical devices by means of which warm air is blown counter-current to the flow of the seed thus making possible the reduction of moisture in a continuous manner. The rate, time, and cost of drying seed by this means is dependent upon the initial moisture content of the seed. When seed is harvested by means of combines, the moisture content is usually higher than that of seed which has been shocked and dried in the field prior to threshing. This seed must be dried immediately upon harvest to prevent excessive deterioration and such drying operations are more costly than drying or curing in the shock. Once seed is dried to a sufficiently low moisture content, it may be stored in bulk without serious deterioration for relatively long periods. Frequently, however, a considerable period of time elapses before the moist seed can be dried and considerable deterioration may have taken place prior to drying.

We have discovered that the spontaneous heating of seeds can be inhibited, and the biological processes leading to deterioration minimized for prolonged periods without affecting the food or industrial value of the seed or its derived products.

According to the invention, these improvements in quality of stored seed are accomplished by treating the seed containing from 15 up to about 30% moisture with a chemical mixture containing about ten parts, by weight, of propylene glycol dipropionate to about one part, by weight, of 1,3-dimethyl-4,6-bischloromethylbenzene in a concentration of about from 0.2 to 1.0% calculated on a dry weight basis of the seed, storing the treated seed for a period of about from 1 to 3 days following the treatment, and thereafter reducing and maintaining the moisture content of the seed below about 15% by ventilating the seed without application of heat.

The delay of about 1 to 3 days is required in order to allow the chemical mixture to penetrate and distribute itself about the seed. Once this is accomplished, there will be no significant loss of chemical when the moisture is subsequently removed. It is desirable that the period of storage prior to removal of moisture be as short as possible. In the case of seed containing approximately 20 to 30% moisture, one day is often sufficient to allow for equilibrium to be reached between the seeds and the added chemicals.

The effect of this treatment is twofold. The activity of the enzymes of the seed which are responsible for heating and deterioration is inhibited. The other effect of our treatment is to eliminate or very greatly reduce the ploliferation of molds and other micro-organisms in the stored seed and thus obviate the harmful effects resulting from their growth.

In most seed processing industries there is a preferred range of moisture content, generally below about 15%, which the seed should have in order to be processed properly in optimum yield of products of good quality. In the case of rice, the preferred range is between 12 and 14% moisture content. A similar preferred range holds for the processing of cottonseed. Seed of moisture content higher than the preferred content, even if it is sound and undeteriorated, must have some moisture removed prior to processing.

We have found that spontaneous processes leading to deterioration can be minimized and reduction in moisture to the range for optimum processing conditions accomplished by a combination of the aforementioned chemical treatment and aeration without application of heat.

The preferred treatment, according to the method of our invention, is to spray the seed, while it is being moved in a closed conveyor, with the required amount of the chemical mixture. We have found that treatment of the seed with the chemical mixture in a concentration of about from 0.2% to 1.0% calculated on a dry weight basis of the seed, preferably in a concentration of about 0.4%, will effectively inhibit deterioration for prolonged periods in all types of seeds having moisture contents up to about 30%.

The seed is then stored in bulk in a bin or silo or any other convenient storage facility. After storage for 1 to 3 days following treatment, the seed is aerated. This may be accomplished by drawing air through the seed pile by means of air-suction facilities placed under the seed pile. Another means of aeration is that of circulating the pile of seed over a conveyor system and returning it to the same or another bin in the seed house. Moisture will be removed from the seed by this process either when the relative humidity of the air surrounding the seed is less than the relative humidity of air in hygroscopic equilibrium with the seed or when the temperature of the surrounding air is approximately 5 degrees F. lower than that of the seed. The process of aeration may be repeated as often as convenient until the moisture content of the seed is reduced to a value considered optimum for processing, generally below about 15%.

Several advantages are gained by drying seed by a combination of chemical treatment and forced atmospheric-air ventilation. Drying can be accomplished without use of expensive equipment. It can be accomplished with equal facility at processing mills and farms. Drying without use of added heat eliminates the danger of overheating the seed with its attendant reduction in the quality of the seed products. Chemical treatment inhibits the respiration of the seed or of the micro-organisms associated with the seed thereby preventing increase in the moisture content of the seed because water is one of the products of respiration. Chemical treatment therefore serves the purpose of stopping all biological activity in the seed, including formation of moisture, until the moisture can be reduced by ventilation to a value at which biological activity and growth of micro-organisms is insignificant. Without the use of chemical treatment, ventilation by unheated air as a means of drying seed is hardly feasible because the seed cannot be dried rapidly enough to prevent onset of rapid biological activity, moisture production, and deterioration.

The process of our invention is further illustrated, although it is not restricted by the following examples:

*Example I*

Flaxseed, having an initial free fatty acids content of 0.4%, was artificially conditioned to a moisture content of 20% and divided into two lots. One lot was treated with a mixture of chemicals containing 10 parts, by weight, of propylene glycol dipropionate and one part, by weight, of 1,3-dimethyl-4,6-bischloromethylbenzene in a concentration of 0.4 percent based on the dry weight of the seed and was then placed in an insulated container.

After two days storage, the chemically treated seed was removed from the insulated container, exposed overnight to moderate air circulation in a forced-draft hood, and then returned to the insulated container.

The second lot of seed was not chemically treated. At the beginning of the storage experiment this lot of seed was exposed overnight to moderate air circulation in a forced-draft hood and then placed in an insulated container under conditions identical with those under which the treated seed was stored.

After 4 weeks of storage under the above-described conditions, samples were taken of the chemically treated and untreated lots of seed and analyzed for moisture and free fatty acids content. The chemically treated seed had a moisture content of 12.5 percent and a free fatty acids content of 0.9 percent whereas the seed which had not been chemically treated had a moisture content of 9.9 percent and a free fatty acids content of 5.5 percent.

Both lots of seed were aerated a second time after approximately 5 weeks of storage. After six weeks of storage a sample of the chemically treated seed had a moisture content of 5.4 percent and a free fatty acids content of 0.9 percent. The untreated seed had a moisture content of 7.8 percent and a free fatty acids content of 16.4 percent. After 10 weeks of storage the chemically treated seed had a free fatty acids content of 1.0 percent.

This experiment has demonstrated that drying by ventilation with unheated air is not sufficient to prevent deterioration of the otherwise untreated flaxseed. Chemical treatment followed with drying by means of ventilation with unheated air succeeded in completely preventing deterioration of the seed.

Example II

Fifteen tons of cottonseed of 18 percent moisture content were collected at a commercial oil mill and treated with a 10:1 mixture of propylene glycol dipropionate and 1,3-dimethyl-4,6-bischloromethylbenzene at a rate of 15 pounds of chemicals per ton of seed. The treated seed was then placed in a bin forming a seed pile 7-8 feet deep.

Thirty-six hours after treatment the treated seed was aerated for 69 hours by blowing the air through the pile. Thirteen days after chemical treatment, the seed was again aerated for 24 hours. Crude oil produced from a sample of the original seed prior to chemical treatment and storage had a refining loss of 11.5% and a Lovibond color of 35 of yellow and 8.8 red. After 40 days of storage under the above-described conditions, crude oil produced from the stored seed had a refining loss of 11.4% and a Lovibond color of 35 yellow and 9.3 red. The cottonseed had a final moisture content of 14.1 percent.

It is concluded from this demonstration that it is possible by means of combination of chemical treatment and aeration to dry cottonseed without application of heat and completely prevent deterioration for forty days of storage, as measured by refining loss and color of the seed products at the end of the storage period.

We claim:

1. A process for preventing deterioration in quality of seed containing from 15 up to about 30% moisture resulting from biological activities of the seed and of the micro-organisms associated therewith comprising treating said seed with a mixture containing about 10 parts, by weight, of propylene glycol dipropionate to about one part, by weight, of 1,3-dimethyl-4,6-bischloromethylbenzene in a concentration of 0.2 to 1.0% calculated on a dry weight basis of the seed, storing said treated seed for a period of from 1 to 3 days following the treatment, and thereafter reducing and maintaining the moisture content of the seed below about 15% by ventilating the seed without application of heat.

2. The process of claim 1 wherein the seed is an oilseed.

3. The process of claim 1 wherein the seed is cottonseed.

4. The process of claim 1 wherein the seed is flaxseed.

5. The process of claim 1 wherein the seed is rice.

AARON M. ALTSCHUL.
MARJORIE Z. CONDON.
MADELINE G. LAMBOU.

REFERENCES CITED

Condon et al., Science, vol. 105, pp. 525-527 (1947).